Nov. 2, 1954 — M. L. HOEWISCH — 2,693,367
TRACTOR KNEE ACTION FRONT WHEEL MOUNTING
Filed Feb. 14, 1952 — 2 Sheets-Sheet 2
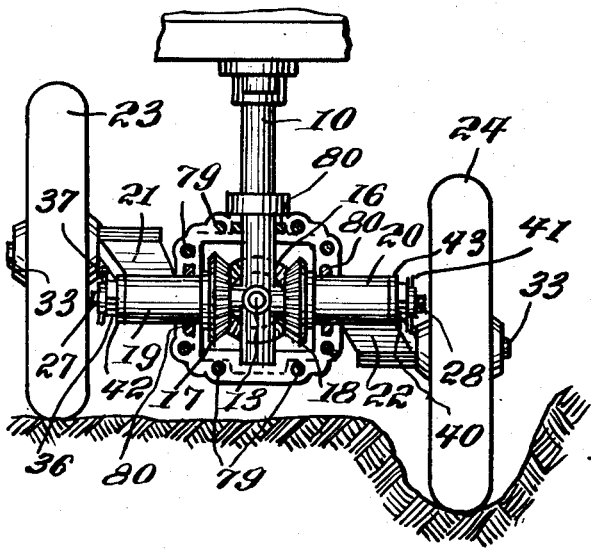
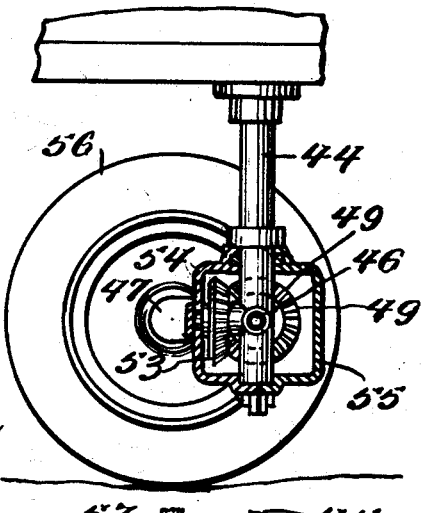
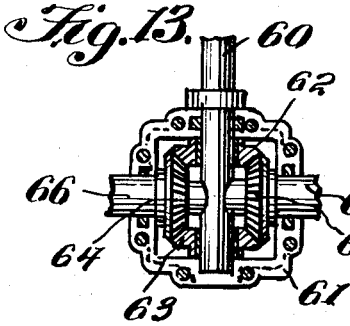
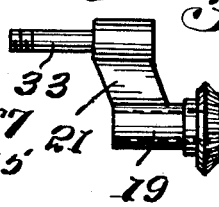
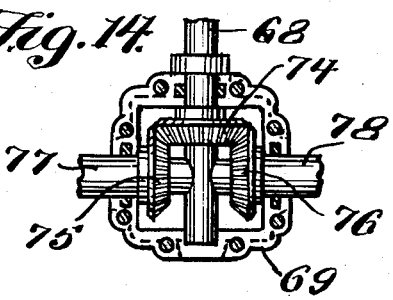
INVENTOR.
Martin L. Hoewisch,
BY Victor J. Evans & Co.
ATTORNEYS

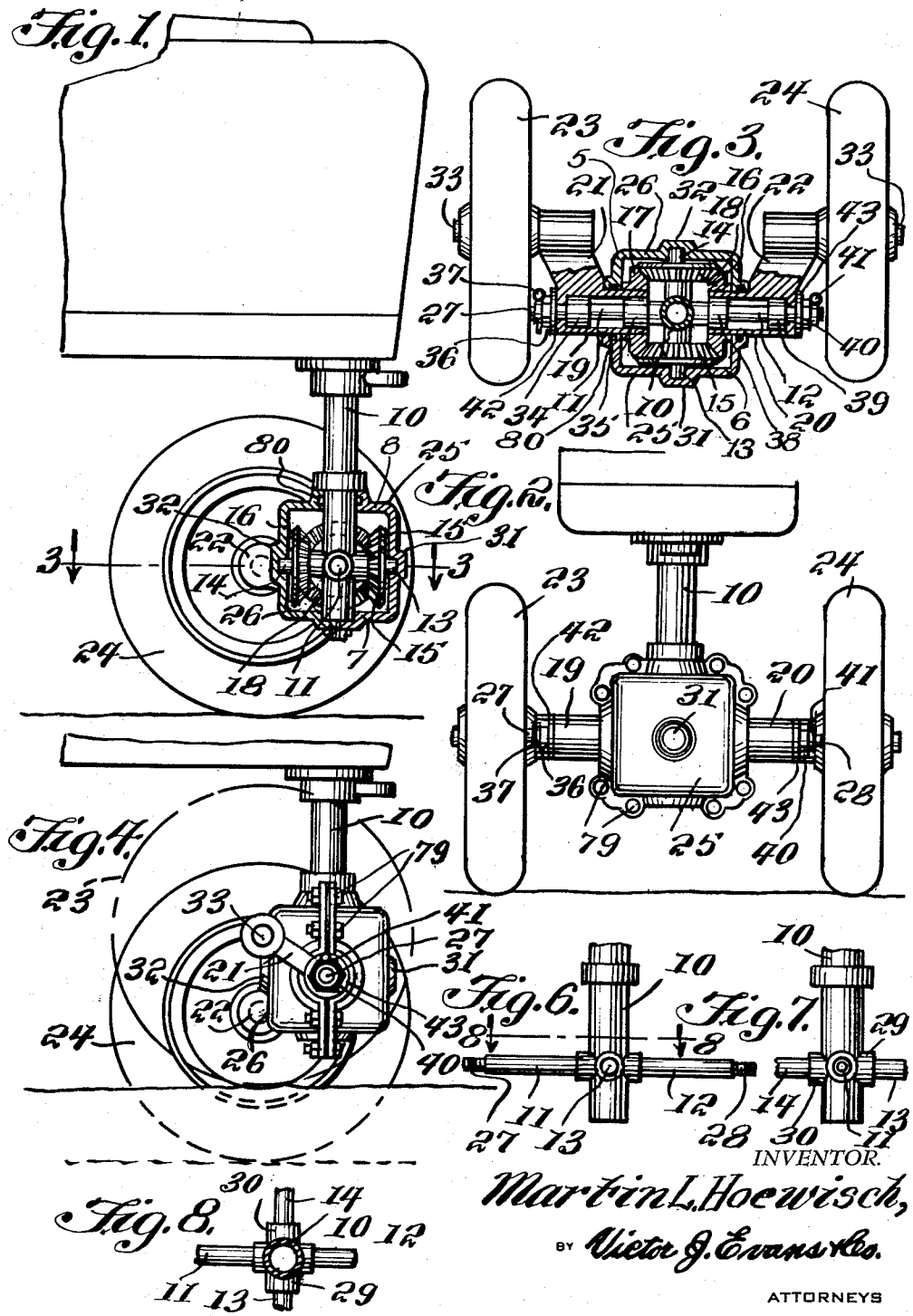

2,693,367

Patented Nov. 2, 1954

2,693,367

TRACTOR KNEE ACTION FRONT WHEEL MOUNTING

Martin L. Hoewisch, Dale, Wis.

Application February 14, 1952, Serial No. 271,586

1 Claim. (Cl. 280—97)

This invention relates to tractors used primarily for planting, cultivating, and harvesting crops planted in rows, commonly referred to as row crop implements and in particular a tractor having a differential gear assembly on the lower end of the steering wheel post providing a straight axle and in which the front wheels are carried by offset arms journaled on the shaft or axle and held by differential gears to provide vertical swinging action of the wheels.

The purpose of this invention is to provide a front wheel mounting for tractors in which both of the front wheels are in contact with the ground continuously so that the load is equalized as the tractor travels over hills and valleys in a row and whereby with the load equalized steering is facilitated.

In the conventional type of front wheel mounting of the front wheels of a tractor used for row crop planting, cultivating and harvesting one wheel travels in one row and another in adjoining row and with the surface of the soil slightly uneven one wheel may be spaced above the ground whereby the load is taken on the other wheel and with one wheel taking the load and the other free steering is difficult. With this thought in mind this invention contemplates a tractor front wheel mounting having a differential action wherein the front wheels swing continuously in vertical planes so that both wheels are in contact with the surface of the ground continuously as the tractor travels over the ground.

The object of this invenion is, therefore, to provide means for incorporating a differential or knee action in the front wheel mounting of a tractor whereby the load on the two front wheels is equalized and steering is facilitated.

Another object of the invention is to provide a front wheel differential mounting that is adapted to be incorporated in the connection between the steering wheel posts and front wheel axle of a tractor.

A further object of the invention is to provide a tractor having a front wheel mounting with a differential therein which is of a simple and economical construction.

With these and other objects and advantages in view the invention embodies a gear housing mounted on the lower end of a steering wheel post with a shaft extended through the housing and with hubs having arms extended therefrom journaled on the shaft or axle and having wheels journaled on the outer ends and beveled gears mounted on the inner ends whereby with the beveled gears mounted on the inner ends positioned in the housing and meshing with one or two gears also journaled in the housing and positioned at a right angle to the gears on the hubs one wheel is free to move downwardly with the other traveling upwardly, so that both wheels are in contact with the ground continuously.

Other features and advantages of the invention will appear from the following description taken in connection with the drawings wherein:

Figure 1 is an elevational view showing the forward end of a tractor with a differential housing on the lower end of the steering wheel post and with the wheel on the near side omitted and the gear housing broken away and shown in section.

Figure 2 is a front elevational view illustrating the position of the differential housing and showing the wheels on level ground.

Figure 3 is a sectional plan taken on line 3—3 of Fig. 1 showing the arrangement of the gears in the housing and in which gears are used at both the front and back providing a four gear assembly.

Figure 4 is a side elevational view similar to that shown in Fig. 1, also with the wheel on the near side omitted and showing the positions of the wheels journaled with one wheel extended downwardly and the other upwardly.

Figure 5 is a front elevational view with the forward part of the differential gear housing removed and also showing one wheel extended upwardly and the other downwardly.

Figure 6 is a detail showing a front elevational view of the lower end of the steering wheel post and showing the wheel carrying axles extended from the sides thereof.

Figure 7 is a side elevational view of the lower end of the steering wheel post showing the stub shafts for carrying the meshing gears of the differential.

Figure 8 is a sectional plan taken on line 8—8 of Fig. 6 of the wheel axles and stub shafts.

Figure 9 is a detail illustrating one of the wheel carrying arms through which the wheels are mounted on the axles.

Figure 10 is a plan view showing the two sections of the differential housing with other parts omitted and with the sections separated.

Figure 11 is an elevational view, similar to that shown in Fig. 1, illustrating a modification wherein a three gear unit is provided.

Figure 12 is a sectional plan, similar to that shown in Fig. 3, showing the unit illustrated in Fig. 11.

Figure 13 is a view, similar to that shown in Fig. 5 illustrating a further modification wherein the meshing gears are mounted on the steering wheel post.

Figure 14 is a similar view illustrating a still further modification wherein the three gear assembly, as illustrated in Figs. 11 and 12 is modified by placing the meshing gear on the steering wheel post.

Referring now to the drawings wherein like reference characters denote corresponding parts the three and four gear differential assembly front wheel mounting of this invention includes a steering wheel post 10 having axles 11 and 12 extended from the sides, and stub shafts 13 and 14 extended from the front and rear, gears 15 and 16 on the stub shafts 13 and 14 and gears 17 and 18 on hubs 19 and 20 of arms 21 and 22, on the outer ends of which wheels 23 and 24, respectively are journaled and, the gears are enclosed within a box-like housing formed with a front wall 25, a rear wall 26, end walls 5 and 6, a base 7 and a top 8.

As illustrated in Figs. 6 and 7 the wheel axles 11 and 12 extend laterally from the lower part of the steering wheel post 10 and the outer ends of the axles are provided with threaded studs 27 and 28, respectively. Also, as shown in Fig. 7 the stub shafts 13 and 14 are provided with shoulders 29 and 30 which provide spacing elements for the gears 15 and 16. The outer ends of the stub shafts 13 and 14 are held in sockets 31 and 32, respectively in the front and rear sections of the housing.

The outer ends of the arms 21 and 22 are provided with shafts or spindles 33, as shown in Fig. 9 on which the wheels 23 and 24 are journaled.

The hub 19 is journaled in bearings 34 and 35 on the axle 11 and the hub is held in position with a nut 36 threaded on the stud 27 and having a pin or key 37 therein.

The hub 20 is journaled with similar bearings 38 and 39 on the axle 12, and the hub is secured in position with a nut 40 having a key or cotter pin 41 therein. The axles are also provided with washers 42 and 43 to facilitate swinging action of the arms 21 and 22 thereon.

With the parts assembled in this manner the wheels are free to swing with one moving upwardly and the other downwardly with the wheels also held in operative engagement with the ground and with this flexibility of movement steering is facilitated as the wheels are in engagement with the ground continuously.

In the design illustrated in Figs. 11 and 12 a steering post 44, similar to the steering post 10, is provided with axles 45 and 46 on which arms 47 and 48, respectively, are journaled and in this design, gears 49 and 50 on the inner ends of hubs 51 and 52 of the arms 47 and 48, respectively mesh with a gear 53 journaled in a section 54 of a housing, similar to the housing shown in Figs. 1 to 10 and the housing is provided with a front section 55. In this design wheels 56 are journaled on spindles 57 and 58 on the ends of the arms 47 and 48, respectively. It will be understood that either three or four gears may be used, as may be desired.

In the design illustrated in Fig. 13 a steering wheel post 60 extends through a housing 61 and gears 62 and 63 positioned in the housing and which are journaled on the post 60, mesh with gears 64 and 65 on hubs 66 and 67 similar to the hubs 19 and 20, and on which wheels, such as the wheels 23 and 24, are mounted, whereby a differential assembly operates similar to that illustrated in Fig. 3 except that meshing gears are vertically positioned instead of being positioned in a horizontal plane.

In Fig. 14, in which a three gear assembly is illustrated, a steering wheel post 68 extends into a gear housing 69 and a gear 74, which is journaled on the post 68, meshes with gears 75 and 76 on the inner ends of hubs 77 and 78, also similar to the hubs 19 and 20 whereby a differential assembly similar to that illustrated in Figs. 11 and 12 is provided except that the meshing gear is vertically positioned instead of being positioned in a horizontal plane.

It will be understood, therefore, that the front axle differential assembly of this invention may be provided with meshing gears in horizontal or vertical planes and the assembly may be formed with a suitable number of gears.

In the design shown the gear housing is formed in two sections and the sections are bolted together with bolts 79. It will also be understood that packing glands such as the gland 80, shown in Fig. 1 may be provided in the openings of the gear housing to prevent oil leaking around the hubs or steering wheel posts.

A tractor having front wheels carried by swinging arms of a differential assembly of this type is comparatively easy to steer with both of the front wheels resting upon the surface of the ground continuously and with the wheels continuously swinging upwardly and downwardly to compensate for uneven surfaces of the ground.

It will be understood that modifications may be made in the design and arrangement of the parts without departing from the spirit of the invention.

What is claimed is:

In a wheel mounting, a vertically disposed steering wheel post, a pair of axles extending laterally from said post, said axles being arranged in end to end relation with respect to each other and secured to said post, a first stub shaft extending forwardly from the front of said post and secured to said post, a second stub shaft extending rearwardly from said post and secured thereto, said stub shafts and axles being arranged in the same plane, a housing including sockets for rotatably receiving the outer ends of said stub shafts, the lower end of said post being positioned within said housing, a pair of bevel gears rotatably mounted on said stub shafts and arranged in spaced parallel relation with respect to each other, an arm including a cylindrical hub rotatably mounted on each of said axles, a bevel gear mounted on the inner end of each of said hubs and positioned within said housing, the bevel gears on said hubs meshing with the bevel gears on said stub shafts, an offset portion extending laterally from each of said hubs, a spindle extending outwardly from each of said arms, and a wheel mounted on each of said spindles, whereby upward movement of one wheel results in downward movement of the other wheel.

References Cited in the file of this patent

UNITED STATES PATENTS

| Number | Name | Date |
|--------|------|------|
| 2,208,601 | Ronning | July 23, 1940 |